(12) United States Patent
Shiiba et al.

(10) Patent No.: US 6,629,008 B2
(45) Date of Patent: Sep. 30, 2003

(54) PRODUCTION CONTROL SYSTEM AND METHOD FOR PRODUCING AIR CONDITIONERS

(75) Inventors: Masamitsu Shiiba, Tokyo (JP); Yoko Hashimoto, Tokyo (JP); Mitsunori Kurachi, Tokyo (JP); Akinori Toyoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 291 days.

(21) Appl. No.: 09/820,646

(22) Filed: Mar. 30, 2001

(65) Prior Publication Data

US 2002/0013719 A1 Jan. 31, 2002

(30) Foreign Application Priority Data

Jun. 9, 2000 (JP) ......................................... 2000-173630

(51) Int. Cl.[7] .............................................. G06F 19/00
(52) U.S. Cl. ........................ 700/100; 700/97; 345/965
(58) Field of Search ............................ 700/95–97, 100; 345/962, 965

(56) References Cited

U.S. PATENT DOCUMENTS

| 5,570,291 | A | * | 10/1996 | Dudle et al. | ................. | 700/95 |
|---|---|---|---|---|---|---|
| 6,006,195 | A | * | 12/1999 | Marchak et al. | ................. | 705/9 |
| 6,072,481 | A | * | 6/2000 | Matsushita et al. | ......... | 707/102 |
| 6,147,686 | A | * | 11/2000 | Brown et al. | ................. | 345/839 |
| 6,236,901 | B1 | * | 5/2001 | Goss | ........................... | 700/95 |
| 6,374,492 | B1 | * | 4/2002 | Myung et al. | ........... | 29/890.03 |
| 6,496,744 | B1 | * | 12/2002 | Cook | ........................... | 700/95 |
| 2002/0010522 | A1 | * | 1/2002 | Martin | ........................ | 700/97 |
| 2002/0077850 | A1 | * | 6/2002 | McMenimen et al. | ......... | 705/2 |
| 2003/0023334 | A1 | * | 1/2003 | Miyazaki | ..................... | 700/96 |

FOREIGN PATENT DOCUMENTS

| JP | 5-274326 | 10/1993 |
|---|---|---|
| JP | 7-110834 | 4/1995 |
| JP | 10-214293 | 8/1998 |

* cited by examiner

Primary Examiner—Leo Picard
Assistant Examiner—Elliot Frank
(74) Attorney, Agent, or Firm—Oblon, Spivak, McClelland, Maier & Neustadt, P.C.

(57) ABSTRACT

An order menu that includes a plurality of specifications in respective functional blocks, into which a customized product is divided into, is provided from a factory through Internet. A customer selects a required specification from the order menu to determine the customized product. Based on data input through the order menu, material arrangement and directions for production can be dealt with on line, and data on the customized product are shared between the customer and a manufacturer.

21 Claims, 13 Drawing Sheets

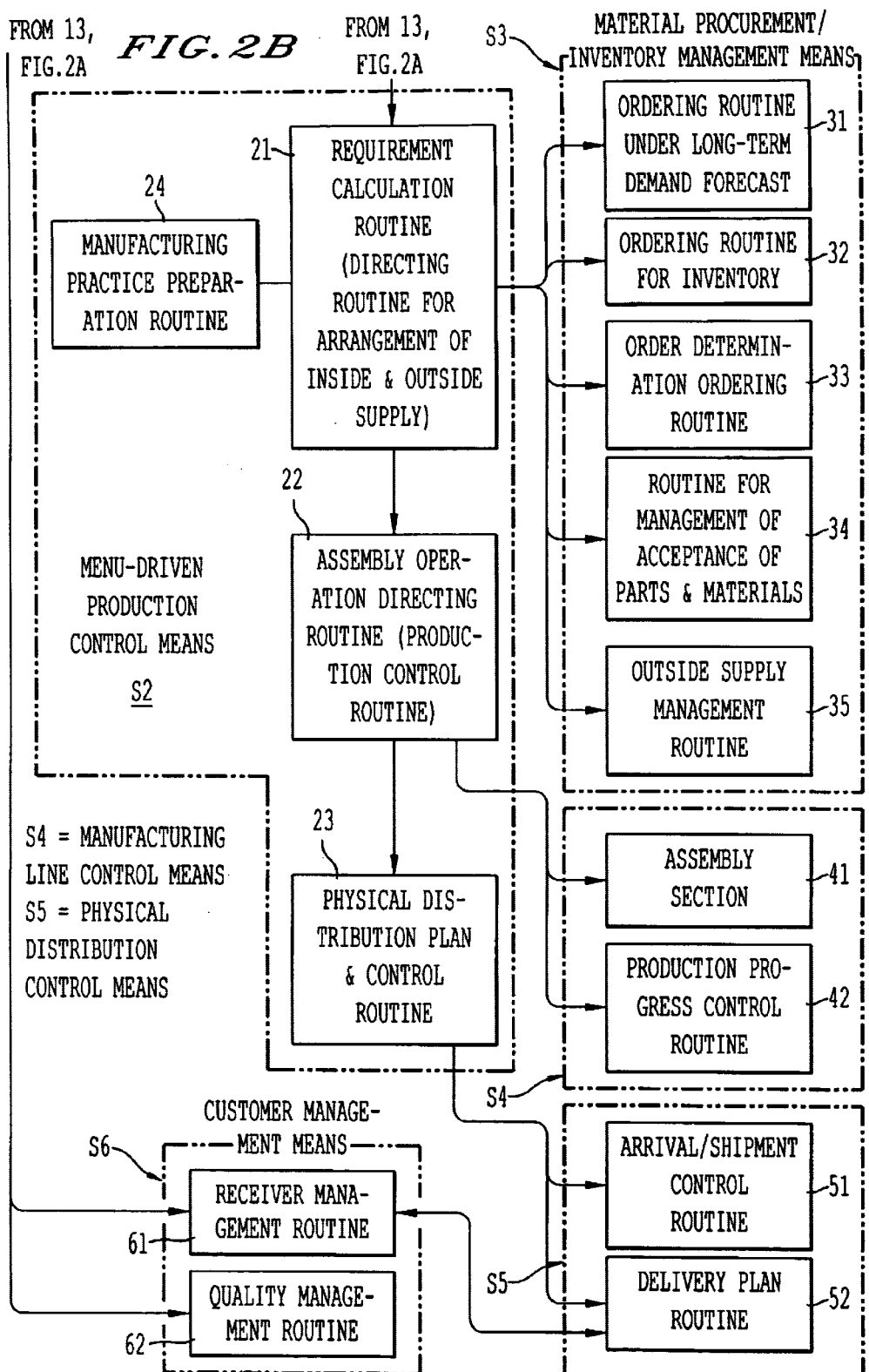

FIG. 5A

FUNCTION BLOCK

P —

ACCUMULATOR

| CUSTOMIZED SPECIFICATIONS | SPECIFICATION CODE |
|---|---|
| HORIZONTAL TYPE 10L | AH10 |
| VERTICAL TYPE 7L | AV7 |
| VERTICAL TYPE 5L | AV5 |
| .. | .. |

COMPRESSOR

| CUSTOMIZED SPECIFICATIONS | SPECIFICATION CODE |
|---|---|
| 5KW- *1 | CN5 |
| 7KW- *1 | CN7 |
| 7KWINV | CV7 |
| .. | .. |

*1 CONSTANT ROTATION — Q

R —

PIPE — 91

| CUSTOMIZED SPECIFICATIONS | SPECIFICATION CODE | PART NUMBER | MODEL NAME ||||
|---|---|---|---|---|---|---|
| | | | LH-CR-D | LH-AR | LV-FE-CI | LV-FR-C |
| RIGHT PIPE TYPE | PR | W123456H01 | | | | |
| MOTORIZED TWO-WAY VALVE | P2S | W234567H01 | ○ | ○ | ○ | ○ |
| MOTORIZED TWO-WAY VALVE INCORPORATED PLUS AUXILIARY DRAIN PAN FOR PIPE ATTACHED | P2SN | W345678H01 | ○ | ○ | ○ | ○ |
| MOTORIZED THREE-WAY VALVE INCORPORATED PLUS AUXILIARY DRAIN PAN FOR PIPE ATTACHED | P3SN | W345678H02 | ○ | ○ | ○ | ○ |
| DIRECTIONAL CONTROL VALVE INCORPORATED | PTTK | W456789H01 | ○ | ○ | | |
| FLOW CONTROL VALVE INCORPORATED | PTTR | W567890H01 | ○ | | ○ | |
| BALL VALVE INCORPORATED | PTB | W678901H01 | | | | ○ |
| .. | | | | | | |
| .. | | | | | | |

SPECIFICATIONS MARKED WITH ○ ARE AVAILABLE

| M | M01 | M02 | M07 | M09 |
|---|---|---|---|---|
| | Assembly date 00/01/18 | Storing date 00/01/19 | Particular requirement | |
| | Model name LH-800CR-D M03 | Model name code 7xL3L0  M04 | Power supply frequency 50Hz  M08 | Quality 7 |
| | Production No. N36F91A9A  M05 | Order No. FA205  M06 | User NEC  M10 | |

*FIG. 8A*

| SPECIFICATION CODE | SPECIFICATION | SPECIFICATION CODE | SPECIFICATION |
|---|---|---|---|
| N4K | FOUR PIPE COILED HEAT EXCHANGER | | |

*FIG. 8B*

| N | N01 | N02 | N03 | N04 | N05 | N06 |
|---|---|---|---|---|---|---|
| No. | Block Name | Specification | Block Structure number | Parts name | Material Code | Required quantity |
| 001 | Frame | DEF | AA01001G04 | P truss screw | S513131H11 | 4 |
| | | | | Square weld nut 6 | S545112H02 | 6 |
| | | | | Front plate assembly | W245821G16 | 1 |
| | | | | Rear plate assembly | W245822G26 | 1 |
| | | | | Suspending fixture L | W398770H01 | 4 |
| | | | | Bush | W492662H02 | 1 |
| | | | | Spacer | W817278H01 | 4 |
| | | | | Heat insulation set 1 | W878014G01 | 1 |
| 002 | Blower | DEF | AA02001G04 | Cable clip 507 | S452003H10 | 2 |
| | | | | PTT screw | S521131H20 | 9 |
| | | | | Tapping screw with washer faced head | S529132H02 | 6 |
| | | | | Mounting plate | W353715H01 | 2 |
| | | | | Blower table | W624267H04 | 1 |
| | | | | Rubber bush | W818836H01 | 2 |
| 003 | Heat exchanger | N4K | AA03003G04 | Heat exchanger | P734987X02 | 1 |
| | | | | Drainage | W850776H01 | 4 |
| 004 | Drain pan | DEF | AA04001G04 | Drain pan assembly | W246012G54 | 1 |
| 006 | Electrical component | DEF | AA06001G01 | Faston terminal block | P436146X01 | 1 |
| | | | | Primer brass pan | S514341H02 | 1 |
| | | | | PPT screw 4x16 | S523111H08 | 2 |
| | | | | Hop nut | S549131H02 | 1 |

*FIG. 8C(1)*

| 008 | Package ~~component~~ | DEF | AA08001G05 | Polypropylene bag | W356300H04 | 1 |
| | | | | Cushion set | W878017G01 | 1 |
| | | | | Corrugated board set | W878022G05 | 1 |
| 009 | Others | DEF | AA09001G01 | Bag | B30D193H04 | 1 |
| | | | | Drain hose assembly | P839002X02 | 1 |
| | | | | Washer | W817265H01 | 8 |
| 010 | Printing matter | N4K | AA10048G05 | Rating plate | W356307Q01 | 1 |
| | | | | Rating plate | W636430G17 | 1 |
| | | | | Plate PL PAC2 | W852786H01 | 1 |
| | | | | Notice plate | W865934H01 | 1 |
| | | | | Manual | WT02058X02 | 1 |
| 011 | Subframe | DEF | AA11001G04 | Guide S | W377585H03 | 1 |
| | | | | Heat insulation set 2 | W635291G01 | 1 |
| 012 | Fan | DEF | AA12001G03 | Fan casing | P712296X01 | 2 |
| | | | | Bolt | W856323H01 | 2 |
| | | | | Fan boss | W858894H02 | 2 |
| 013 | Electric motor | DEF | AA13001G05 | Motor CG-3516B | P714385X02 | 1 |
| 014 | Subdrain pan | DEF | AA14001G01 | Subdrain pan assembly | W818831G05 | 1 |

*FIG. 8C(2)*

PRODUCTION CONTROL SYSTEM AND METHOD FOR PRODUCING AIR CONDITIONERS

FIELD OF THE INVENTION

The present invention relates to a production control system for product development, acceptance of an order, material arrangement, assembly operations and the like in product manufacture. The present invention also relates to a production control technique which is directed to large variety individual production rather than large variety mass production, and which can minimize stock of finished products.

DISCUSSION OF THE BACKGROUND

In a conventional system for development, production and sales of products, models having a standard specification have been set based on market needs, and the development has been carried out for the respective models. The production mode is speculative production, which is based on the sales performance or the past market trend for similar models. If the demand forecast is different from the actual market demand, the stock of finished products increases or lack of stock occurs. Production plans have required elaborate modification, and directions for material procurement have been reconsidered whenever needed.

Products except for models having a standard specification have been required to be customized, which needs particular product design. Most of customized products can be provided by modifying a standard specification, wherein, on the basis of the standard specification, addition of parts or elimination of unnecessary parts is made so as to adapt to the customized specification. The addition of parts or the elimination of unnecessary parts has required a designer's determination for customized specifications whenever accepting orders. Arrangement of untypical parts or directions for untypical manufacturing operations for adaptation to a customized product specification requires the presence of a person in charge of flow control in production for respective customized products.

A conventional production system has been disclosed in, e.g., JP-B-77432. In FIG. 9 is shown a block diagram of the entire production system for retail goods of the conventional production system. As shown in this figure, the system comprises a retail sales information collecting means 100, a production size setting means 120, a directing means for direction the preparation and production of raw material 130 and a production means 140.

The retail sales information collecting means 100 includes POS terminals installed at different retail outlets and public networks 110 for correcting the POS terminals to a host computer. The production size setting means 120 includes a scale-up estimating routine 150, a demand forecast routine 160 and a production size determining routine 170. The scale-up estimating routine 150 receives sales information from the POS terminals through the public networks 110 as input data at any time. The scale-up estimating routine 150, which calculates a scale-up estimate based on the sales information, is connected to the demand forecast routine 160, where demand forecast is carried out based on the scale-up estimates for respective products forwarded by the scale-up estimating routine 150. The final sales estimates thus obtained at the demand forecast routine 160 are forwarded to the production size determining routine 170 connected to the demand forecast routine 160. The required size of additional production thus determined is forwarded to a raw material procurement routine 190 and the control unit 141 of the production means 140 simultaneously through the directing means 130 for production. Whenever the production at the production means 140 is completed, the inventory data and the additional production data in an inventory data table 171 are timely updated to be used as new data.

Such a conventional production system has created the following problems.

Actual sales results could be against a determined production plan because of speculative production according to the demand forecast estimated from the sales information. In such a case, the stock of finished products increases to cause loss in warehouse administrative and maintenance expense, or the delivery time required by a customer can not be met, leading to failure to accept an order.

In factory production, a relevant department draws up a production plan to increase the efficiency of its own department. This can cause the term from acceptance of an order placed by a customer to the delivery of the ordered product to be extended, the stock of unfinished products to increase, or to increase the number of persons in charge of modification and design of the production plan.

In addition, the specifications required by customers have greatly diversified, causing speculative production to become impossible. This could cause the delivery time for the ordered specifications to extend or required delivery not to be met, leading to failure to accept the order.

SUMMARY OF THE INVENTION

It is an object of the present invention to eliminate these problems and to provide a production control system capable of preventing the stock of products from increasing or lacking when actual sales results are against demand forecast for speculative production, avoiding failure to accept an order because of unmet delivery time, meeting the delivery time requested by a customer without stock of finished products by producing products with the specifications required by the client met in the ordered number, directly reflecting information of customers' orders on production, and sharing necessary information among a customer, a factory and a parts manufacturer to improve the efficiency from acceptance of an order to production.

It is another object of the present invention to provide a production control system for air conditioners wherein an air conditioner is divided into functional blocks, and large variety of customized products can be produced in a short period of time by selectively combining function blocks in accordance with customers' requirements.

It is another object of the present invention to provide a method for producing air conditioners, wherein information on an ordered specification for an air conditioner, which is inputted by a customer, can be processed and administrated on line through a computer to effectively produce the product required by the customer in a short period of time.

According to a first aspect of the present invention, there is provided a production control system comprising an order acceptance management means for determining a customized product based on a customized specification and a delivery time of the customized product input by a customer through a screen, the order acceptance managing means including a routine for preparing a menu-driven specification, which produces the customized specification selected by the customer based on a menu table; a menu-driven production control means for providing required directions on material procurement, inventory management, manufacturing line control and physical distribution based on the customized specification, and for carrying out planned control based on production data; and a customer management means for supporting delivery and maintenance of the product based on data on order acceptance given by the order acceptance management means; wherein operations from order acceptance to material procurement and directions for production can be dealt with on line, and data on the product ordered by the customer are shared between the customer and a manufacturer of the product.

In the production control system according to the first aspect, the screen may show at least one of a perspective view and a menu table of functional blocks, into which the customized product is divided in terms of function.

In the production control system according to the first aspect, the menu table may be modified or updated based on market needs, in terms of, e.g., a standard specification and a plurality of optional specifications.

In the production control system according to the first aspect, the menu table may include a standard specification and a plurality of specifications in respective functional blocks, the product being divided into the functional blocks in terms of functions so that the functional blocks are coupled and combined in accordance with criteria of certain positions and connecting devices to perform certain functions.

The production control system according to the first aspect may further comprise a production seat producing means for producing production seats in a number corresponding to an acceptable production schedule found based on an estimated number of products to be produced in consideration of demand size forecast, estimated man-hours for production and assembly capacity of a production process; and a production seat management means for collating production man-hours required for production according to the delivery time of the customized product with an unoccupied state in a seat table corresponding to the production schedule to finalize the delivery time.

In the production control system according to the first aspect, the menu-driven production control means may comprise a requirement calculation routine for reading out, based on product constitution of the customized product, production arrangement data of constituting elements of the customized product from manufacturing practice data with drawing data, production data and parts procurement data included therein; an operation direction producing routine for producing data on procedure and guidelines for assembly of the customized product based on product specification data from a memory for storing data on order acceptance and the manufacturing practice data; and a physical distribution control means for providing delivery directions for shipment of a finished product based on data on the delivery time and a receiver stored on the memory for storing data on order acceptance, and data on production progress.

In the production control system according to the first aspect, the customized specification may be input to the order acceptance management means from the customer through a public communication network, wireless communication or satellite communication.

In the production control system according to the first aspect, parts arrangement may be carried out from a factory to a parts manufacturer through an EDI communication network.

In the production control system according to the first aspect, the order acceptance management means and the menu-driven production control means may be connected to the customer management routine, a material procurement and inventory management means, a manufacturing line control means and a physical distribution control means through at least a communication line.

According to a second aspect of the present invention, there is provided a method for producing an air conditioner, which is divided into at least a heat source block for a refrigeration cycle, a driving block for a heat medium circulation in the refrigeration cycle, and a circulation connecting block for the refrigeration cycle, comprising the steps of providing an order acceptance management means for determining a customized product by selection among a standard specification and a plurality of optional specifications held with respect to the respective blocks; and providing a menu-driven production control means for providing required directions on material procurement, inventory management, manufacturing line control and physical distribution based on the customized specification and a delivery time of the customized product, and carrying out planned control based on production data; wherein operations from order acceptance to material procurement and directions for assembly can be dealt with on line.

According to a third aspect of the present invention, there is provided a method for producing an air conditioner, which comprises a compressor, a condenser, an expansion device and an evaporator, comprising the steps of providing a standard specification and a plurality of optional specifications with regard to respective functional blocks, into which the air conditioner is divided in terms of functions; producing a specification of a customized product based on specification data determined for the respective functional blocks; and managing production seats corresponding to production schedule for the specification of the customized product based on material procurement data and man-hours for production for the respective functional blocks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a schematic view showing an example of the data structure of the specification structure data base for customized products according to the embodiment.

DESCRIPTION OF MY PREFERRED EMBODIMENTS

Embodiment 1

Now, an embodiment of the present invention will be described in detail in reference to the accompanying drawings.

Figure 1:
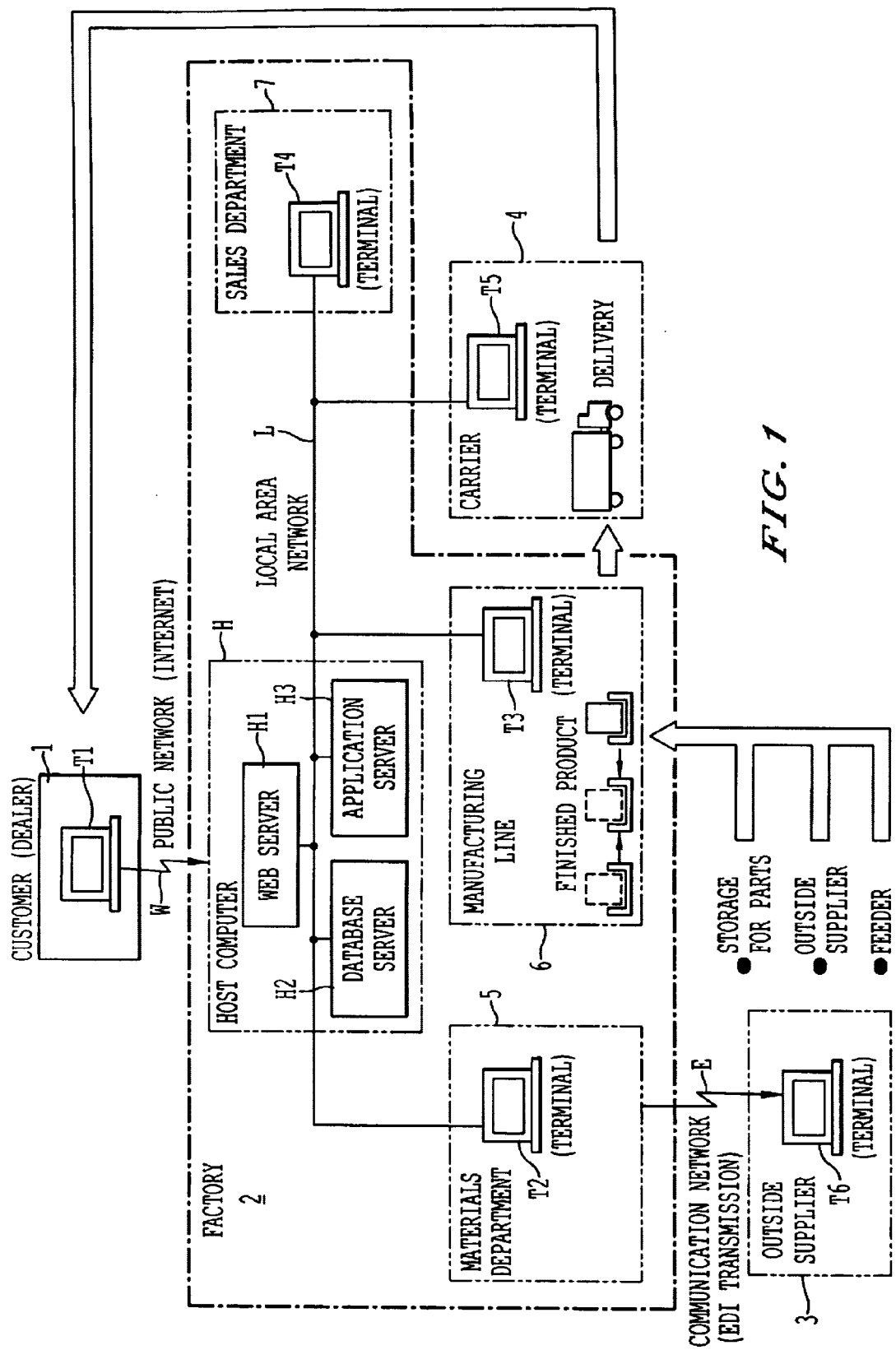
FIG. 1 is an overall schematic view of the production control system for accepting an order in menu-driven fashion according to an embodiment of the present invention.

In FIG. 1 is shown a schematic view of the entire structure of a production control system for accepting an order in menu-driven fashion. In FIG. 1, reference numeral 1 designates a customer or dealer, reference numeral 2 designates a manufacturing factory for accepting an order for products from the customer 1 and providing the products with the customer after production, reference numeral 3 designates an outside supplier for supplying materials or parts in accordance with procurement or orders from the factory 2, and reference numeral 4 designates a carrier for delivering the finished products assembled at the factory 2 to the customer in accordance with instructions from the factory 2. Reference numerals 5–7 designate different departments in the factory 2. Reference numeral 5 designates a materials department, which procures necessary materials or parts based on information on the specification, the quantity and the delivery date of the products ordered by the customer, reference numeral 6 designates a manufacturing line where the materials and parts procured according to a production plan are assembled in an ordered specification to complete the ordered products. Reference numeral 7 designates a sales department, which forecasts demand size and a trend in demand for the products and administers the delivery of the completed products to the customers. In the factory, a host computer H serves as the heart, the materials department 5, the manufacturing line 6 and the sales department 7 are connected together through a local area network L, the customer 1 and the factory 2 are connected together through a public network W, and the factory 2 and the outside supplier 3 are connected together to a communication network E by, e.g., EDI transmission. The communication between the customer and the factory may be wireless or satellite communication.

The EDI transmission is communication using an electronic data interchange system, where data in on-line commerce, e.g., materials dealing strips, between companies are captured into PCs or information systems of the respective companies by data interchange for business processing.

The host computer H installed in the factory 2 supervises the order menu production control. The host computer includes a Web server H1 for communication between the customer 1 outside the factory and the factory through Internet, and also includes a data base server H2 for various kinds of master data and an application server H3 for various kinds of application programs for collective management. At the materials department 5, the manufacturing line 6 and the sales department 7 in the factory, and at the carrier 4 are installed terminals T2–T5 for access to the host computer H. Through the terminals, various kinds of data controlled by the host computer H, such as materials arrangement and operating directions, are provided, and the data base is updated based on data on operation progress.

The customer or the dealer 1 can input information on the specification of its ordered products on Web by connecting its terminal T1 to the host computer H of the factory 2 through Internet as the publication network W. Based on the information, the host computer H determines a combination of constitution of the ordered products having the specific specification and a production plan of the ordered products, and makes arrangement, such as materials procurement, by online processing. Thus, required directions can be automatically provided to save the labor and to improve the required operations, and required information becomes available to relevant departments in real time to improve the work. The ordered products that have been assembled along the production plan are carried to the delivery place on the delivery date as the customer requested, and then were delivered to the customer. Since the information on the product specification requested by the customer can be directly transmitted to the factory as stated earlier, the accuracy of the information on the products ordered by the customer can increase, and the order acceptance operation up to determination of the specification can improve.

The outside supplier 3, which supplies required materials or parts, uses its own terminal T6 to carry out information interchange with the materials department 5 in the factory 2 through the communication network E. Based on the obtained information, the outside supplier furnishes the supplies of the materials or the parts requested by the factory after withdrawal from the storage of parts or after required processing. The information that is available to the outside supplier 3 from the factory 2 includes information on acceptance of orders with respect to products or information on demand forecast so as to be shared between the outside supplier and the factory. The outside supplier 3 can independently manage its own business in consideration of materials procurement plans for proper inventory.

Figure 2A:
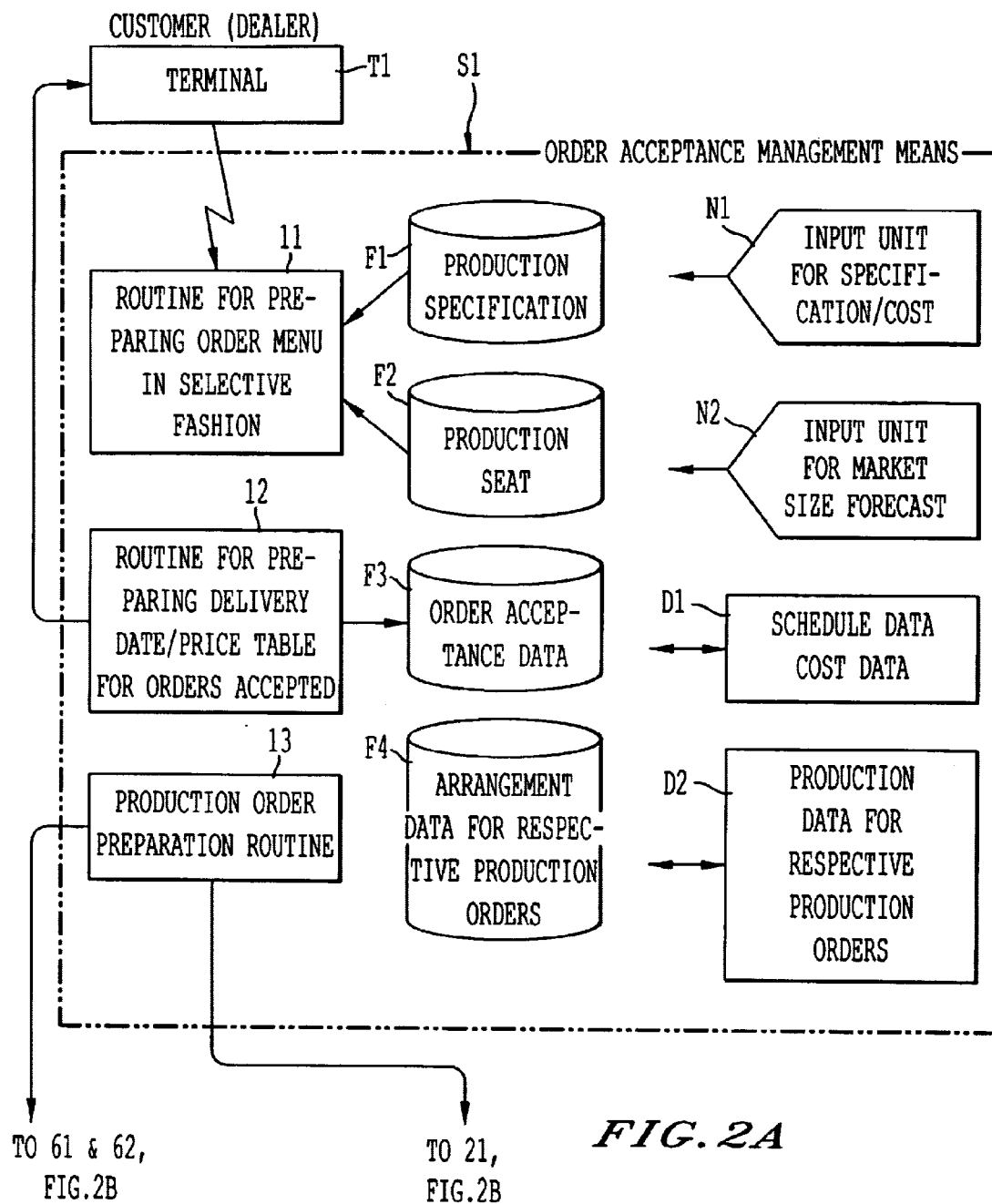
FIG. 2 is a block diagram showing the structure of the embodiment.

In FIG. 2 is shown a block diagram of the structure of the production control system for accepting an order in menu-driven fashion. S1 designates an order acceptance management means for determining the specifications of ordered products based on information input from the terminal T1 of the customer 1, S2 designates a menu-driven production control means for receiving the information of the ordered products produced at the order acceptance management means S1 and determining materials procurement for assembly or production plans, S3 designates a materials procurement/inventory management means for receiving information related to the materials in the menu-driven production control means S2 and carrying out materials procurement to the outside supplier 3 and arrival control of the supplied materials, S4 designates a manufacturing line control means for receiving the production plans from the menu-driven production control means S2 and assembling products, S5 designates a physical distribution control means in charge of arrival, shipment and transportation of finished products based on information on the physical distribution supplied from the menu-driven production control means S2, and S6 designates a customer management means for carrying out management for customers and products based on information from the order acceptance management means S1.

Now, the order acceptance management means S1 will be explained. In FIG. 2, reference N1 designates a specification/cost input unit for a design department (not shown) to input design data, reference N2 designates a market size forecast input unit for the sales department to input sales data, reference D1 designates a memory for information on schedules and information on costs, and reference D2 designates a memory for product data for respective production orders. Different specifications for a plurality of variations that are prepared, in menu-driven fashion, for respective functional blocks of products stated later on, and the data on the costs that are required to adopt the respective specifications are read out from the input unit (N1) and are stored on a product specification file F1. The market demand size forecast data for different typical models that can cover various kinds of customized products are read from the input unit N2, and the number of acceptable production seats for respective days, or acceptable production schedules for customized products, which are found by calculation based on estimated man-hours including the estimated numbers of products to be produced and the number and time of production steps required for assembly of the products as well as the production capacity of the manufacturing line, are stored on a production seat file F2. The phrase "seats" means carrier pallets for assembly, which are used at the manufacturing line to produce respective products.

A customer or dealer establishes a connection with the host computer H of the factory from its own terminal T1 through Internet and carries out an input operation for customized products on the Web of the Web server H1. On the Web, the customer or dealer can specify the constitution of the products by selecting required product specification and delivery time at a routine 11 for preparing order menu in selective fashion in the order acceptance management means S1. The routine 11 has the production specification file F1 and the production seat file F2 linked thereto. The routine 11 produces the specification for the customized products based on the prestored data in accordance with the information on the order from the customer. The routine 11 also carries out production seat management wherein the man-hours founded from the specification of the customized products are allotted to the empty state of the production seat table to determine an accepted delivery time, i.e., a production schedule for assembly.

Figure 4:
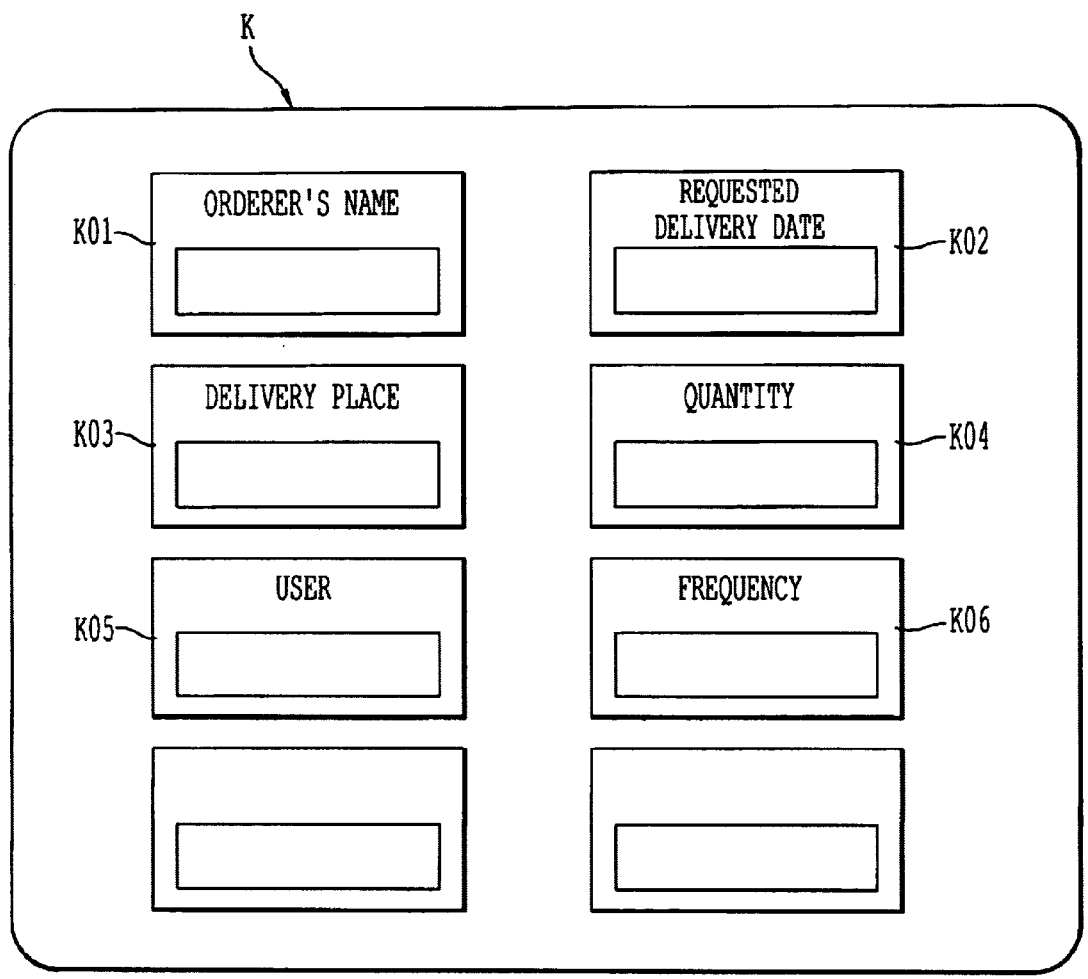
FIG. 4 is a schematic view showing an example of the screen for input of information on an order according to the embodiment.

In FIG. 4 is shown an example of the screen of the terminal T1, on which the customer or dealer inputs required data, such as a delivery date and a delivery place. The example shown in FIG. 4 is a customization information input screen K, on which the customer (dealer) inputs, on its own, an orderer's name K01 as a requester of customized products, a requested delivery date K02 to delivery the finished products to an installation place, a delivery place K03, a quantity of the customized products K04, an user K05 as the owner actually using the customized products, the frequency of the power source K06 for operating the products, and other data into respective items. The customization information input screen includes input fields for detailed information on production delivery, such as receiver's name, a receiver's phone number, a designated delivery time and a carrier size, though not shown. The customization information input screen may be represented in a perspective view.

Figure 5:
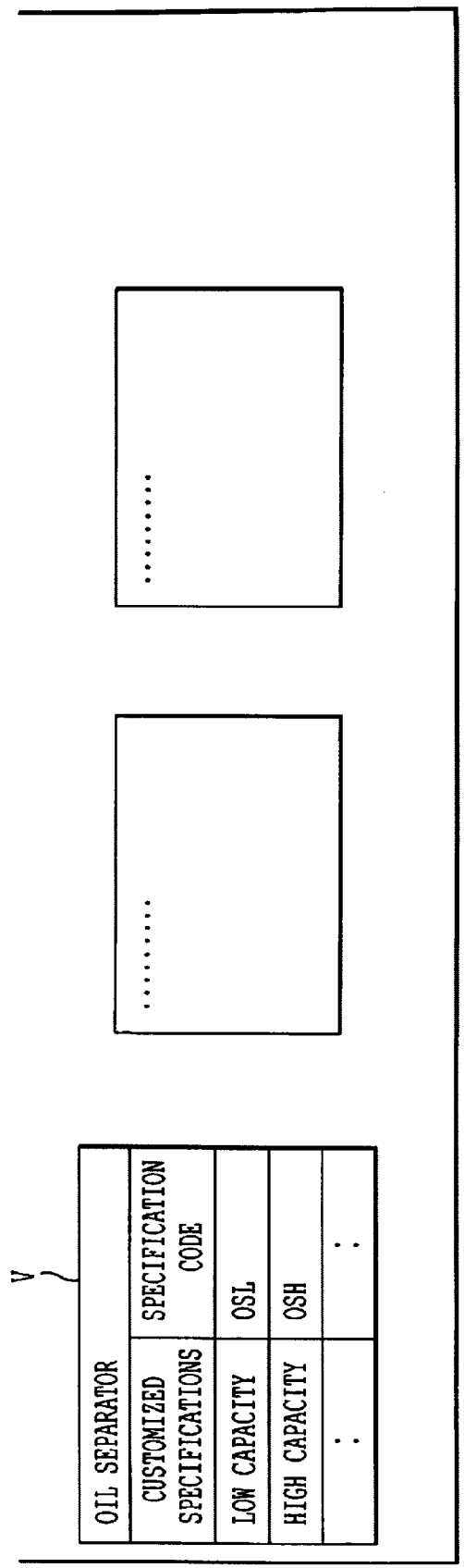
FIG. 5 is a schematic view showing an example of the data structure of the selective menu data base for respective function blocks according to the embodiment.

In FIG. 5 is shown an example of the screen where the customer or dealer can select the specification of the customized products. In FIG. 5 is shown a data structure of a selective menu database for respective functional blocks in an outdoor unit of an air conditioner. This database is kept on the product specification file F1. In this example, the outdoor unit is divided into functional elements, such as a pipe assembly R, an accumulator P, a compressor Q, an oil separator V and the like as the functional blocks, and the respective functional blocks have a plurality of optional specifications, which are variations that can meet customers' or dealers' requirements and are acceptable for production. The data of the model name compliance table 94 for each of the optional specifications, which show customized specifications 91 with the contents thereof described, specification codes 92 shown by code designation, parts numbers 93 corresponding to manufacturing drawings, and availability of customized specifications under ordered model names are stored on the file F1.

In the example of FIG. 5 are shown variations in the respective specifications with respect to the pipe assembly R, which is a functional block having a function to change the direction of a flow and to control the quantity of the flow in a refrigeration cycle as one of the respective blocks of an air conditioner. The second column shows the standard specification in this block wherein a motorized two-way valve version is indicated in the customized specification item 91 and models available under this specification are indicated by symbol ○ in the model name item 94. The specifications except for the second column are available as optional specifications. The specification in the first column shows a right pipe type, though the extending direction of the refrigerant pipe from an outdoor unit is left-hand in the standard specification. In the first column, the specification code is PR, the part number is W123456H01, and available models are two models of LV-FE-C1 and LV-FR-C. The third column and the columns thereunder show a plurality of optional specifications for this function block. As shown, options, such as a specification with a motorized two-way valve incorporated plus an auxiliary drain pan for a pipe attached, a specification with a motorized three-way valve incorporated plus an auxiliary drain pan for a pipe attached, a specification with a directional control valve incorporated, a specification with a flow control valve incorporated, and a specification with a ball valve incorporated, are available.

With respect to the accumulator P, the compressor Q, the oil separator V and other members as the other functional blocks, the data on the customized specification 91, the specification code 92, the part number 93 and the model name compliance table 94 for each of the variations are stored on the file F1. In FIG. 5, the items of the customized specification and the specification code with respect to the respective members are shown though the remaining items are not shown for simplification. The accumulator P, which has a function of storing an excessive portion of a circulation refrigerant caused by an increase or decrease in the amount of the refrigerant due to load change in the refrigeration cycle, can be selected among a horizontal type specification 10L with a horizontal type accumulator having an effective capacity of 10 l as the standard specification, a vertical type specification 7L with a vertical type accumulator having an effective capacity of 7 l as an optional specification, a vertical type specification 5L with a vertical type accumulator having an effective capacity of 5 l, and other specifications. The compressor Q, which has a driving source function of sucking a refrigerant gas, discharging the gas after compression and circulating the gas in the refrigerant circuit, can be selected in a single or plural number to satisfy a required refrigerating capacity among a 5 KW constant rotation type specification with a hermetic motor driven rotary compressor having constant rotation and an output of 5 KW provided as the standard specification, a 7 KW constant rotation type specification with the rotary compressor having an output of 7 KW provided as an optional specification, a 7 KW INV type specification with an inverter compressor adoptable to variable frequency control and having an output 7 KW provided as an optional specification, and other specifications. The oil separator V, which has a function of recapturing a refrigerating machine oil in the refrigerant circulating in the refrigeration cycle and returning the oil to the compressor, can be selected among a low capacity specification with an oil separator for units having a small amount of refrigerant circulation provided as the standard specification, a high capacity specification with an oil separator for units having a large amount of refrigerant circulation provided as an optional specification, and other specifications. As the other functional blocks, heat exchangers, which are a heat source block having a function of transferring heat between the refrigerant in the refrigeration cycle and an external heat transfer medium, and blowers, which have a function of enhancing the heat transfer between air as the external heat transfer medium and the heat exchanger, are also included in the order menu table, though these members are not shown in FIG. 5.

The data on the specifications and the delivery time of the customized products, which have been constructed and produced in a routine for preparing an order menu in selective fashion 11 of FIG. 2, are conveyed to the processing step in a routine for preparing a delivery date/price table for orders accepted 12. The routine for preparing delivery date/price table for orders accepted 12 prepares an assembly schedule for production based on the production seat management and also reads out required data from the memory D1 for schedule data and cost data with data on the costs of materials and parts and data on days required for delivery of the materials and the parts to calculate the price of the customized products and to determine the delivery time of the customized products. Various data on the customized products are recorded on an order acceptance data file F3. At that time, the various data on the customized products are presented to the customer having input the specifications of the customized products, and thus the acceptance of the order is finalized.

In FIG. 8 is shown an example of the data structure of a specification structure database for customized products, which is stored in the file F1. The upper table shows a summary of order acceptance M for model identification at production based on information on order acceptance, the intermediate table shows a specification remark J, which is used if the explanation of specifications corresponding to specification codes is required, and the bottom table shows a parts list N where data on all parts constituting each of the functional blocks of customized products are described. The summary of order acceptance table M includes data on an assembly date M01 at the manufacturing line, a storing date M02 for finished products if they are stored in a warehouse before delivery, a model name M03 of customized products, a model name code M04 of the model, a production order number M05 as a management number for directions for customized production, an order number M06 for each of orders accepted, a particular requirement where a particular item, such as a resistance-to-salt specification, can be described, the power supply frequency M08 for actual use of the products, and the user M10. In this example, the indication of "LH-800CR-D" in the model name M03 tells that the model of the customized products is a two-way outlet cassette type indoor unit for an air conditioner having a capacity 800 cfm (cubic feet per minute).

The parts list table N includes the data on block names N01, specification codes N02, block construction numbers N03, names N04 of all parts constituting respective functional blocks, material codes N05 for arrangement of parts, and required quantity N06 of required parts with respect to each of the functional blocks constituting the customized products.

In this example, the line 001 tells that a frame under the functional block name N01 is a unit having functions of provision of an air pass between an air inlet and an air outlet and of heat installation with outside. The line 001 also tells that the specification code (N02) is DEF and the block structure number (N03) is AA01001G04. A parts item of the parts constituting this functional block is named "P truss screw" as indicated in the parts name (N04), its material code (N05), which indicates the drawing number of that part and can be commonly used, is S513131H11, and the required quantity (N06) is four. A second item, a third item and subsequent items are listed in the same way as in the first item. The eighth item as the final item is named "heat insulation set 1", its material code is W878014G01, and the required quantity is 1. This means that the frame as one of the functional blocks in this example is assembled as a single functional block from the eight kinds of parts.

Refereeing now to FIG. 2, when the acceptance of an order is determined, the information on the accepted order are transmitted to a production order preparation routine 13, where manufacturing plans for respective production orders as directions for customized production are prepared for directions of product production in the factory. The data on the construction table, which describe the functional blocks constituting customized products, are read out from the memory D2 for production data for respective production orders with respect to each of the production orders. Based on these data, the data on the material arrangement for product production are recorded on an arrangement data file F4 for the respective production orders. In accordance with the operation flow using a computer under the order acceptance management means S1, whenever information on acceptance of an order is input, a new production schedule for the customized products at the manufacturing line is incorporated into the production schedules at the manufacturing line, i.e., the schedule on dummy (unoccupied) production seats in the previous production plan based on the schedule data on the material procurement and the assembly for the respective blocks of the customized products, and the production plan is chronologically updated for actual production. Accordingly, flexible responsiveness to specification changes for the respective functional blocks and to changes in production load become possible.

Next, the process proceeds to the menu-driven production control means S2 after completion of the process at the order acceptance management means S1. Based on the data of the production constitution prepared at the production order preparation routine 13 and recorded on the arrangement data file F4 for the respective production orders, data on the arrangement for required parts for production of the customized products are produced at a requirement calculation routine 21. The requirement calculation routine is linked with a manufacturing practice data preparation routine 24 for producing data on material procurement and data on directions for operation and processing. The requirement calculation routine reads out data on the production arrangement of the relevant block number so as to correspond to the data of the respective functional blocks constituting the customized products, and sets the required quantity of the respective parts of the respective block, the schedule for supply of the parts, the date of commencement of the operation and the date of completion of the operation. Thus, the development into the directions for material arrangement and directions for operation can be automatically carried out. After that, the determined information is sequentially transmitted to an assembly operation directing routine 22 for production control and a physical distribution plan and control routine 23 for producing directions on delivery of finished products and on storage of the finished products.

In the material procurement/inventory managing means S3, directions to arrange the parts and the materials of the respective blocks from the requirement calculation routine 21 are transmitted to an ordering routine under long-term demand forecast 31, an ordering routine for inventory 32, an order determination ordering routine 33, a routine for management of acceptance of parts and material 34 and an outside supply management routine 35. The respective routines read out required data to make the material procurement for the order menu production. The parts to be arranged include ones that can be supplied in a short-term as general-purpose parts because of availability on the market, and ones that require several months from order to supply because of particular specifications or required special processing. With regard to the parts that require a long term to be supplied or are used in a large amount, the ordering routine under long-term demand forecast 31 places orders to the outside supplier based on a forecast of product market size. With regard to the parts that are constantly used for various kinds of product production, the ordering routine for inventory 32 sends directions to arrange the required parts to take out the required parts from stocked parts. With regard to the block constituting parts whose material procurement term from order to supply fits the production at the manufacturing assembling line even in consideration of required lead time, the order determination ordering routine 33 sends required orders. The routine for management of acceptance of parts and materials 34, which manages whether the parts ordered by the ordering routines 31–33 have been delivered to designated places in designated numbers on designated dates or not, and the outside supply management routine 35, which manages the quantities, the schedules and the delivery of supplied parts when rough parts or daughter parts are supplied to an outside processing firm to be processed into desired parts, receive required data in the material procurement/inventory management means S3 and carry out required material arrangement.

In the manufacturing line control means S4, data on the procedure for assembly of the customized products and data on operational guidelines, such as working methods, facilities, jigs and conditions, which are produced at the assembly operation directing routine 22 based on the specification data and the manufacturing practice data of the customized products, are received by an assembling section 41 of the manufacturing line. In the manufacturing section, the assembly parts for the respective functional blocks, which have been procured for each of the customized products, are carried to a manufacturing line side in accordance with the production plan under the production seat management, and the assembling operations for the customized products are carried out in accordance with the operational directions under the operational guidelines. A work progress control routine 42 stores data on the completion of product assembly in accordance with the required processes and the operating directions under the guidelines, and shipping inspection data, such as performance testing and operational/appearance checking, carried at the final process of the manufacturing line for each of finished products, for management.

In the physical distribution control means S5, an arrival/shipment control routine 51 specifies inventory locations based on model names and planned shipment dates and stores required data for directions of arrival and directions of shipment of the products, based on information from the physical distribution plan and control routine 23, which produces physical distribution plans for the products by determining, based on the production shipment information on the delivery dates and the delivery locations of the respective products read out of the order acceptance data and on the production progress data at the manufacturing line, whether the products should be directly carried to customers' designated places or to a warehouse before shipment to customers. A delivery plan routine 52 carries out management of shipping operations by reading out information on the shipping cartons and the quantity of the customized products, regions of receivers and delivery dates and preparing arrangement plans of transport vehicles. Thus, effective transport operations can be carried out, the customized products may be carried directly to the receivers from the factory without being stored in the warehouse before delivery, eliminating a large warehouse and reducing storage costs.

A customer management means S6 includes a receiver management routine 61, which managements the names and the places of receivers and delivery times of customized products to be delivered based on information produced at the production order preparation routine 13 in the order acceptance management means S1 for each of the customized products, and a quality management routine 62, which holds and manages information on the quality and the maintenance of the products to be delivered based on the information. The receiver management routine 61 is linked with the delivery plan routine 52 and has a role in the verification and adjustment between delivery dates specified by customers and dates available for shipment at the factory.

As explained, the data, such as the product specifications, the product delivery times, the production schedules and the work progress statuses of the customized products are collectively managed by the host computer through the local area network installed in the factory, and such data are available even at the material department and the sales department. After completion of the product assembly at the manufacturing line in the factory, the finished products may be directly carried to the customers' designated places, and the temporary storage in a warehouse may be eliminated, offering an advantage to reduce the inventory for distribution. The operations from the acceptance of orders to the production and the shipment of products can be constituted as a series of operations using the computer to improve business efficiency by a decrease in the labor force and to provide collective management of data on the production of customized products, offering an advantage that the customized products can be produced and supplied in a short term.

Figure 3:
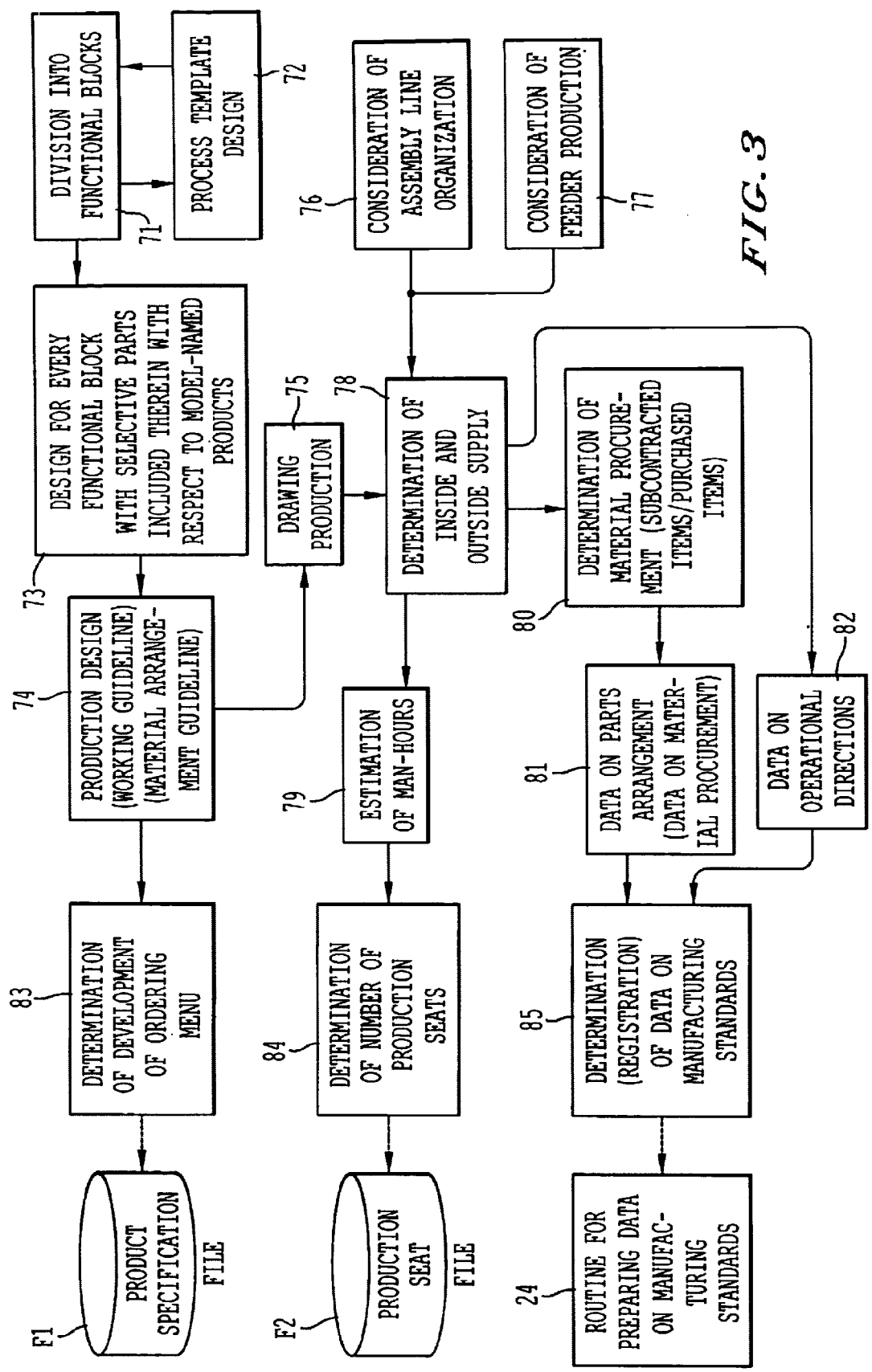
FIG. 3 is a block diagram showing product development to deal with production based on acceptance of an order in menu-driven according to the embodiment.

In FIG. 3 is shown a block diagram of product development as the basis of the order acceptance management means S1 for enabling production based on an order menu.

In this Figure, division into functional blocks 71 is to divide a product constituted from various kinds of parts into functional elements, e.g., to divide an air conditioner into a compressor block having a function of compressing a refrigerant in a refrigeration cycle and circulating the refrigerant, a pipe block having a function of switching the flow direction of the refrigerant and controlling the flow rate of the refrigerant, a heat exchanger block having a function of transferring heat between the refrigerant and an external heat transfer medium, and a blower block having a function of promoting the heat transfer between the external heat medium and the heat exchanger. Product development design is carried out, grasping the respective functional blocks as objects in a three-dimensional space. A functional block is interrelatedly connected with another functional block to constitute a complete product. The respective functional blocks have variations as options in addition to a standard specification so as to meet specifications required by customers. The respective functional blocks are constituted by respective parts, and the respective parts in a variation may be different from those in another variation. Since the respective blocks are combined to form a single product, the correction point and the correction specification for the respective functional blocks are determined as being common, so that any products can be assembled so as to have a required function even if any variations in the specifications available in the functional blocks are selected. By specifying the arrangement/layout of incorporation of the respective functional blocks into a product housing, the mounting height, the mounting position and the connection of parts, which have a role to couple and connect functional blocks, can be provided with a size standard or a material standard to make the parts compatible and to facilitate the product assembly. For example, although the outer size of the housing of a compressor employed in an air conditioner varies on outputs, products assembly with compatibility can be provided irrespectively of what specification of the compressor is selected. This is because, if only the mounting position of the compressor in an unit and the position of the connecting ends of the respective pipes for suction and discharge are specified for compatibility, the compressors can be designed as being compatible.

Figure 6:
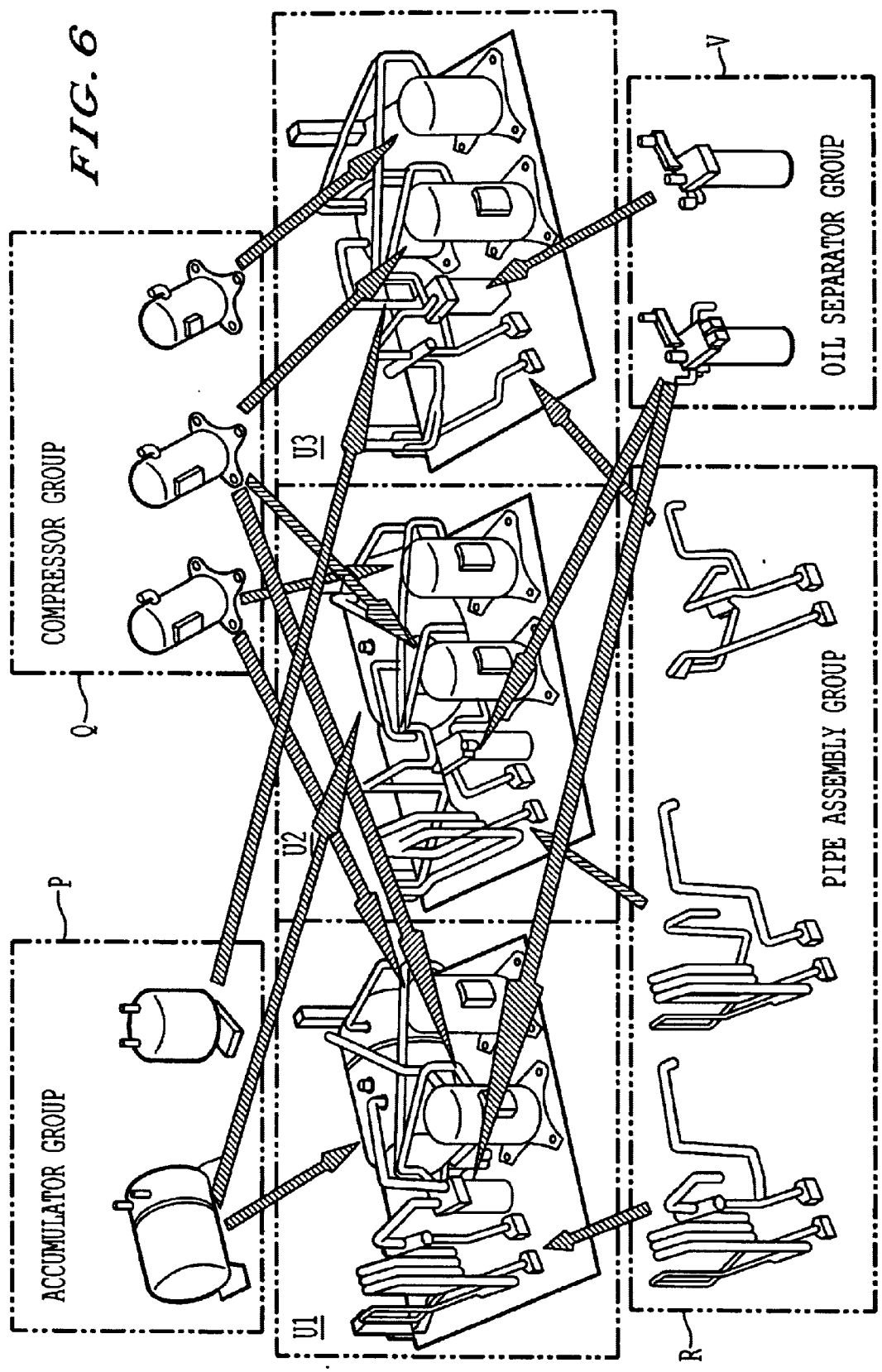
FIG. 6 is images showing examples of products wherein parts are selected in respective function blocks and the selected parts are combined according to the embodiment.

In FIG. 6 is shown an image view of examples of products with parts selected and combined in the respective functional blocks. In this figure, references P, Q, R and V designate examples of block groups that are provided by dividing an air conditioner outdoor unit into functional blocks. Reference P designates an accumulator group, which has a function of storing an excessive part of the refrigerant in a refrigeration cycle, reference Q designates a compressor group, which has a function as a driving source of circulating a refrigerant in the refrigeration cycle, reference R designates a pipe assembly group, which has a function of switching the flow direction of the refrigeration cycle and controlling the flow rate of the refrigerant, and reference V designates an oil separator group, which has a function of recapturing a refrigerating machine oil in the circulating refrigerant and returning the oil into a compressor. In the columns of U1–U3 are shown three typical outdoor units, wherein customers select constituting elements having required specifications among the constituting elements in the respective blocks and the selected constituting elements in the respective blocks are connected and combined.

In the case of the outdoor unit in the column U1, a horizontal type accumulator P01 having a capacity of 10 l as a standard specification is selected from the accumulator group P, an inverter type compressor Q01 having an output of 7 KW as an optional specification and a constant rotation type compressor Q02 having an output of 7 KW are both selected from the compressor group Q, a pipe assembly R01 for a heat pump with a heat recovery function as an optional specification is selected from the pipe ASSY group R, an oil separator V01 having a large capacity as an optional specification is selected from the oil separator group V, and the constituting elements thus selected are placed on the certain positions for the respective functional blocks and are coupled by the pipe assembly thus selected to assemble the refrigerant circuit of the outdoor unit. The indoor unit in the column U3 is different from the indoor unit in the column U1 in that a vertical accumulator P02 having a capacity of 7 l as an optional specification, both of a constant rotation type compressor Q2 having an output of 7 KW as an optional specification and a constant rotation type compressor Q3 having an output of 5 KW as a standard specification, a pipe assembly R03 for heat pumps as an optional specification, and an oil separator V02 having a small capacity as a standard specification are selected.

When the outer housing of a product is grasped in a three-dimensional space, the respective functional blocks have limited arrangement areas in the space. In each of the outdoor units U1–U3, the accumulator P is placed at a right rear position in the unit, the compressor Q is placed at a right front position in front of the accumulator P in the unit, the oil separator V is placed at an intermediate position on the left side of the accumulator P and the compressor Q in the unit, and the pipe assembly R is placed at the leftmost position on the left side of the oil separator V in the unit. Such three models have similar arrangement. Although the blocks are not stacked 2 or 3 high in the examples, the functional blocks may be allocated in the height direction or the horizontal direction. In the rooms allocated to the respective functional blocks in the space, the arrangement of the constituting elements is free in the unit as long as the arrangement meets with the requirements for the connecting position with another functional block and for the connection specification thereof. For example, the connection specification determines standards, such as a pipe size, the thickness of the pipe, and the engagement allowance size of coupled pipes, since the respective functional blocks are connected and combined into a refrigeration cycle circuit in an air conditioner.

As explained, respective products are divided into functional blocks and the respective functional blocks are grasped as three-dimensional assemblies. This provides advantages that a free combination of functional blocks becomes available, product information management can be carried out for the respective functional blocks, the products can be standardized, parts management can become effective, and the specifications required by customers in various ways can be met. It is easy to abolish some of the specification variations in the respective functional blocks, and to add a new specification variation as one of the specifications of a functional block in response to a new request from a customer, because products are divided into functional blocks and a free combination of the functional blocks becomes available. In addition, there is provided an advantage that it is easy to amend or abolish drawings as the basis of product production since the product production can be carried out as the basis of template design in the respective blocks.

Although the explanation has been made with respect to a case wherein the respective functional blocks are placed and fixed on the outer base of a product and the functional blocks are connected and assembled, only determination on the connecting specification between functional blocks allows the functional blocks to be assembled into a product as long as the connecting portions have required mutual holding strength with respect to the engaged blocks.

When the connecting portions between functional blocks can be connected using flexible tubes, greater design freedom in the functional block can be provided.

Coupling blocks by pipe connection may be made using flanges and screws for fixture. Such fixture allows exchange to be made on a block basis for removable of a block for a modification in the product specification due to a change in the operating circumstance in finished products, improving economical effect.

Figure 7:
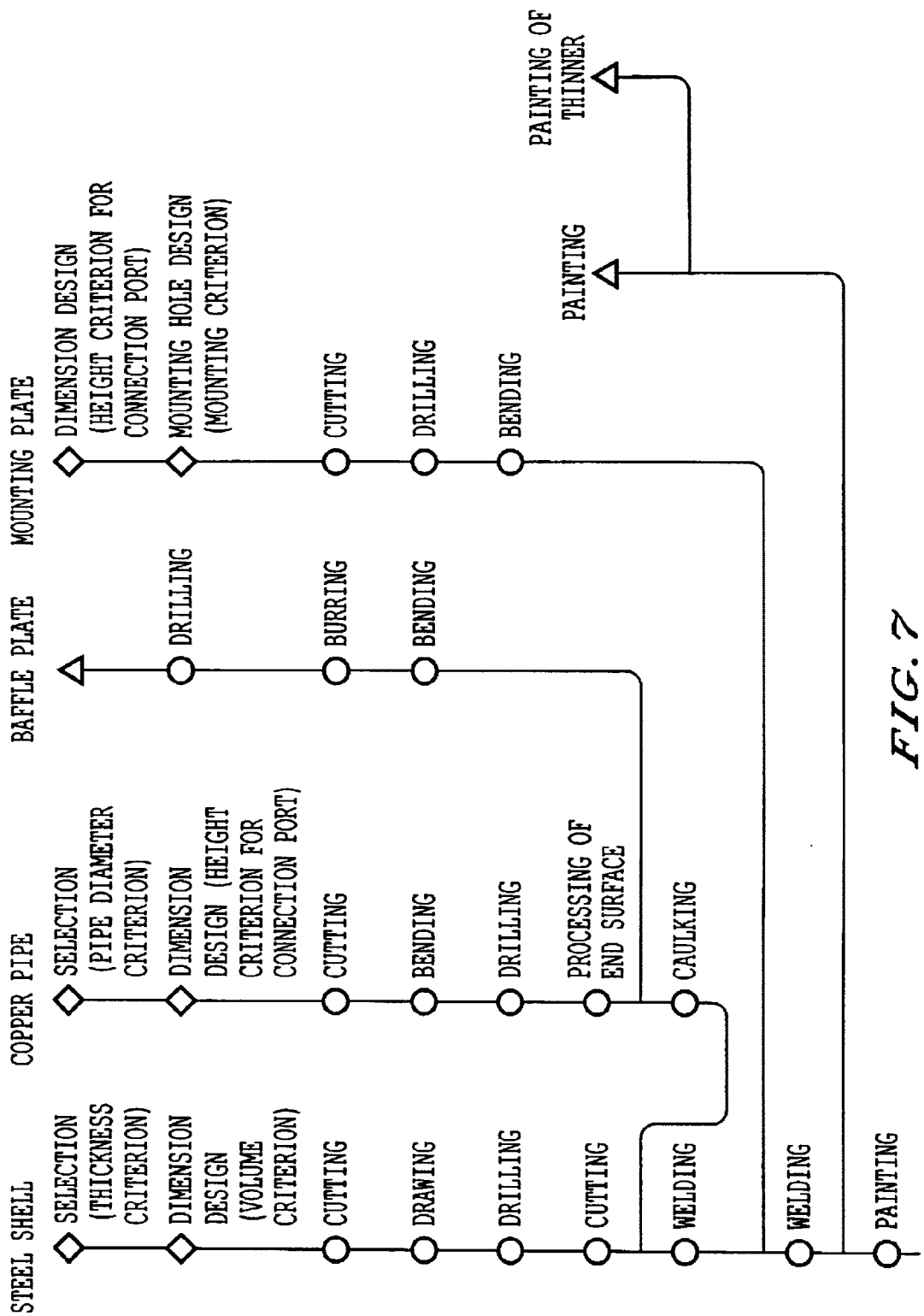
FIG. 7 is a flowchart showing an example of the template design for an accumulator according to the embodiment.
Figure 9:
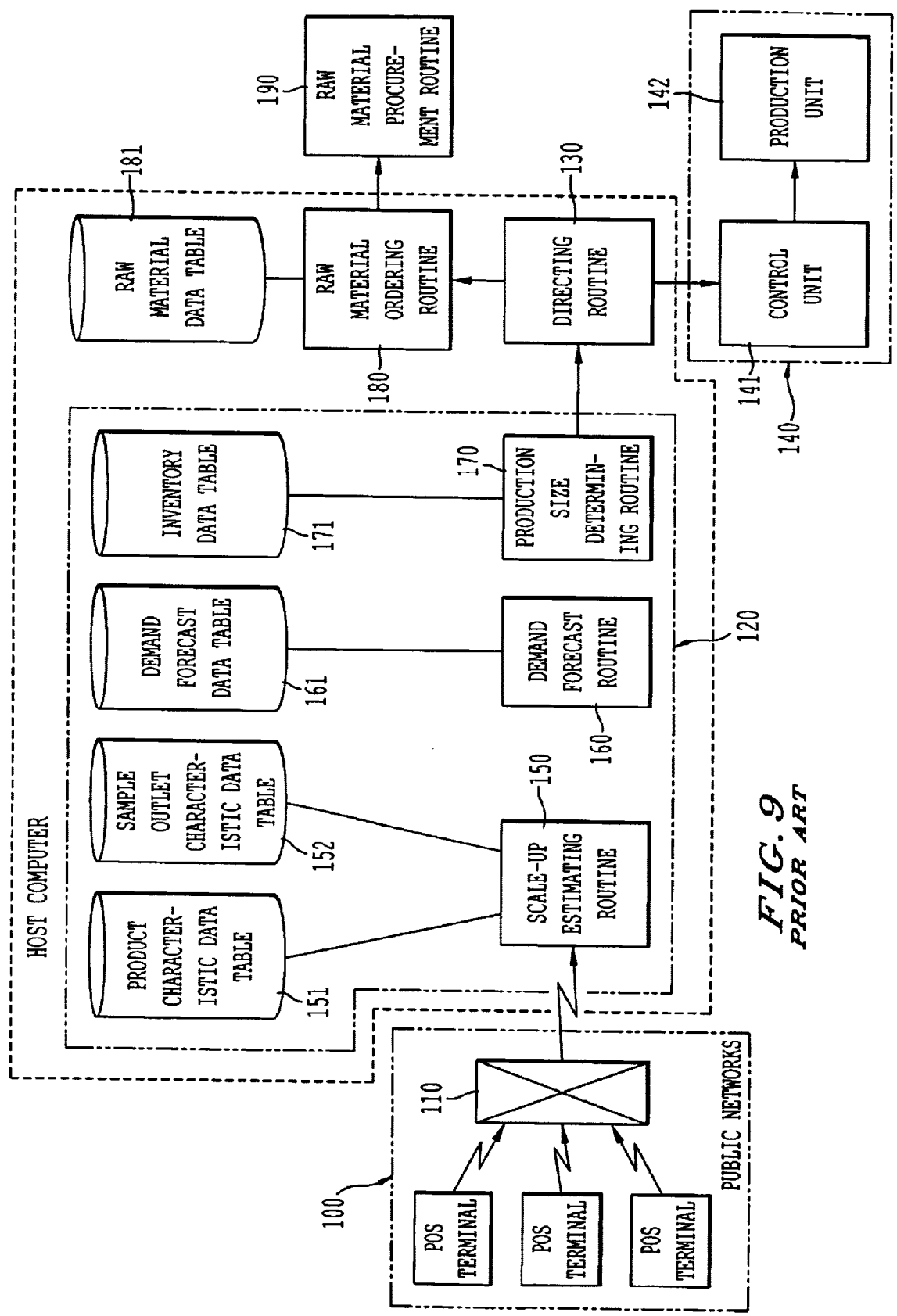
FIG. 9 is a block diagram of a conventional production system for retail goods.

As shown in FIG. 3, the respective blocks determined by the division into functional blocks 71 have the specifications for the connecting positions, the sizes and the materials at the connections between functional blocks standardized by process template design 72. In the process template design, the specification design for the respective functional blocks is carried out in accordance with templates, wherein the contents and the procedure for processing and assembly using basic models are constructed as design flow in the respective functional blocks. Thus, the specifications for the connecting positions, the size and the materials at the connecting portions between functional blocks are standardized. In FIG. 7 is shown a flowchart of an example of the process template design of an accumulator. For each of the parts constituting the accumulator are shown the design criteria, required processing, parts to be combined and procedure. In this example, with regard to the steel shell as a main body, a thickness criterion (e.g., 2.3 mm) for material selection and then a volume criterion as dimension design are shown. After that, cutting, drawing and drilling of the material, and a process to combine the material with another constituting element by welding are shown. In the case of a copper pipe as another constituting element, a pipe size criterion (e.g., an outer diameter of 19 mm and a thickness of 1.2 mm) as material selection and a height criterion for connection ports of a pipe as dimension selection are shown. In the case of the mounting plate for fixing an accumulator, a height criterion for a connecting port as dimension design and a mounting criterion for connection with the outer wall of an unit as design for mounting holes are shown. Thus, the connecting specification for connection between the accumulator and another functional block (e.g., a compressor) is determined in common, enabling a free combination of functional blocks. The respective parts constituting the accumulator are processed, are combined by welding and are finally painted in anticorrosive paint, completing the fabrication and processing operations. This is the process template design for accumulators as one of the functional blocks, wherein the design criteria and the manufacturing processes necessary for division into functional blocks are shown to produce required drawings, and information items required for the drawings are described. The respective functional blocks have templates showing the arrangement relationships and the connection specifications of the functional blocks with a basic model as a basis, and the development in the respective blocks are made having the process template design as a basis. As a result, the constituting parts can be effectively standardized, the design quality can be effectively improved, and the management and the use of product information can be optimized.

When the constitution of the respective operational blocks can be optimized by the division into functional blocks 71, the operation moves design for every functional block 73 with parts having different specification included therein, and standardizing parts and making parts commonly used in the respective functional blocks are carried out to optimize the parts. The model names of the products specify the constitution of the functional blocks for the products, which determine the number and the contents of the functional blocks.

When the design for every functional block 73 with respect to model-named products is completed, production design 74 is carried out based on the design for mass production. In the design, specification design is carried out to meet a working guideline as a guideline for assembly and a material arrangement guideline as a guideline for arrangement of parts and materials.

At the stage of completion of the production design 74, menu tables have been prepared in such a manner that products are divided into functional blocks, and the respective functional blocks have standard specifications and a plurality of optional specifications. When the contents of the menu tables are determined in consideration of marketability, development determination of the order menu 83 is completed. The determined order menu is the basis of the menu tables stored on the product specification file F1 for use in the order acceptance management means S1.

On the other hand, drawing production for mass production 75 is carried out based on the production design 74. Then, determination of inside and outside supply 78 which, in consideration of various parts constituting products in terms of processing technology, equipment investment, labor and costs, determines whether required processing is carried out in the factory or outsourced to the outside supplier, is made. The determination of inside and outside supply 78 is carried out based on consideration of assembly line organization 76 for product fabrication at the factory and consideration of feeder production 77 for prefinish operation at, e.g., a line side. When whether the parts are supposed to be manufactured in the factory or outsourced is determined at the determination of inside and outside supply 78, estimation of man-hour for production of the respective products 79 is prepared by accumulating the man-hour of the respective parts constituting the products based on the data given by the determination 78. Determination of the number of the production seats 84 is carried out by calculation based on the estimation 79 in consideration of the production capacity in the factory. The determined number of the production seats is used as basic data for entry on the production seat file F2 and is utilized in the order acceptance management means S1.

Determination of material procurement 80, which determines whether the various parts are items processed by the outside supplier or purchased items, is carried out based on the determination of inside and outside supply 78. In accordance with the determination 80, data on parts arrangement 81 are activated, and data on operational directions 82 are activated for items processed by the outside supplier. Based on both of data 81 and 82, determination of data on manufacturing standards 85 is carried out. The data on manufacturing standards are utilized in the manufacturing practice data preparation routine 24 of respective customized products in the menu-driven production control means S2.

According to the first aspect of the present invention, there is provided a production control system comprising the order acceptance management means for determining a customized product based on a customized specification and a delivery time of the customized product input by a customer through a screen, the order acceptance managing means including a routine for preparing a menu-driven specification, which produces the customized specification selected by the customer based on a menu table; a menu-driven production control means for providing required directions on material procurement, inventory management, manufacturing line control and physical distribution based on the customized specification, and for carrying out planned control based on production data; and a customer management means for supporting delivery and maintenance of the product based on data on order acceptance given by the order acceptance management means; wherein operations from order acceptance to material procurement and directions for production can be dealt with on line, and data on the product ordered by the customer are shared between the customer and a manufacturer of the product. This arrangement can supply the product met a customer's requirement and can deal with the customized product in a short term, offering an advantage to minimize inventory in a factory.

In the production control system according to the first aspect, the screen may show at least one of a perspective view and a menu table of functional blocks, into which the customized product is divided in terms of function. In this case, various kinds of production specifications can be determined, offering advantages to cope with various kinds of requirements of customized products requested by customers, and to facilitate input operations in the production of the customized specifications.

In the production control system according to the first aspect, the menu table may be modified or updated based on market needs, in terms of, e.g., a standard specification and a plurality of optional specifications. This arrangement can match the menu table to the market needs.

In the production control system according to the first aspect, the menu table may include a standard specification and a plurality of specifications in respective functional blocks, the product being divided into the functional blocks in terms of functions so that the functional blocks are coupled and combined in accordance with criteria of certain positions and connecting devices to perform certain functions. This arrangement can combine functional blocks to produce customized products, offering advantages to standardize the customized products and to cope with variety of requests given by customers.

The production control system according to the first aspect may further comprise the production seat producing means for producing production seats in a number corresponding to an acceptable production schedule found based on an estimated number of products to be produced in consideration of demand size forecast, estimated man-hours for production and assembly capacity of a production process; and the production seat management means for collating production man-hours required for production according to the delivery time of the customized product with an unoccupied state in a seat table corresponding to the production schedule to finalize the delivery time. This arrangement can determine the production seat reservation (the production assembly plan) for production, flexibly coping with changes in production load, saving labor force because of automation and improving operation efficiency.

In the production control system according to the first aspect, the menu-driven production control means may comprise the requirement calculation routine for reading out, based on product constitution of the customized product, production arrangement data of constituting elements of the customized product from manufacturing practice data with drawing data, production data and parts procurement data included therein; the operation direction producing routine for producing data on procedure and guidelines for assembly of the customized product based on product specification data from a memory for storing data on order acceptance and the manufacturing practice data; and the physical distribution control means for providing delivery directions for shipment of a finished product based on data on the delivery time and a receiver stored on the memory for storing data on order acceptance, and data on production progress. This arrangement can automatically provide directions on operations from material procurement to shipment based on data on the customized product, saving the labor and improving operation efficiency.

In the production control system according to the first aspect, the customized specification may be input to the order acceptance management means from the customer through a public communication network, wireless communication or satellite communication. This arrangement can convey data on the customized specifications requested by customers directly to the factory, increasing accuracy and improving the efficiency of an order acceptance operation.

In the production control system according to the first aspect, parts arrangement may be carried out from the factory to the parts manufacturer through an EDI communication network. This arrangement can chronologically convey demand forecast and material data from the factory, offering an advantage that parts manufacturer can adjust procurement and inventories to optimize business.

In the production control system according to the first aspect, the order acceptance management means and the menu-driven production control means may be connected to the customer management routine, the material procurement and inventory management means, the manufacturing line control means and the physical distribution control means through at least a communication line. This arrangement can link data on operations from order acceptance to production and shipment so that required data are available to respective departments in real time to make business effective.

According to the second aspect of the present invention, there is provided the method for producing an air conditioner, which is divided into at least a heat source block for a refrigeration cycle, a driving block for a heat medium circulation in the refrigeration cycle, and a circulation connecting block for the refrigeration cycle, comprising the steps of providing the order acceptance management means for determining a customized product by selection among a standard specification and a plurality of optional specifications held with respect to the respective blocks; and providing the menu-driven production control means for providing required directions on material procurement, inventory management, manufacturing line control and physical distribution based on the customized specification and a delivery time of the customized product, and carrying out planned control based on production data; wherein operations from order acceptance to material procurement and directions for assembly can be dealt with on line. This arrangement can select the optimized specifications in terms of conditions of an installation place of an air conditioner, such as heat load, circumstances and a power source, and can carry out the production and the shipment in a shorter term than before to eliminate loss due to lingering in physical distribution by supply of the finished product in such manner to match to schedule for installation work.

According to the third aspect of the present invention, there is provided a method for producing an air conditioner, which comprises a compressor, a condenser, an expansion device and an evaporator, comprising the steps of providing a standard specification and a plurality of optional specifications with regard to respective functional blocks, into which the air conditioner is divided in terms of functions; producing a specification of a customized product based on specification data determined for the respective functional blocks; and managing production seats corresponding to production schedule for the specification of the customized product based on material procurement data and man-hours for production for the respective functional blocks. This arrangement can select the optimized specifications in terms of conditions of an installation place of an air conditioner, such as heat load, circumstances and a power source, and can carry out the production and the shipment in a shorter term than before to eliminate loss due to lingering in physical distribution by supply of the finished product in such manner to match to schedule for installation work.

The entire disclosure of Japanese Patent Application JP2000-173630 filed on Jun. 9, 2000 including specification, claims, drawings and summary are incorporated herein by reference in its entirety.

What is claimed is:

1. A production control system comprising:
order acceptance management means for determining a customized product based on a customized specification and for determining a delivery time of the customized product input by a customer through a screen, the order acceptance management means including a routine for preparing a menu-driven specification, which produces the customized specification selected by the customer based on a menu table;

menu-driven production control means for providing required directions on material procurement, inventory management, manufacturing line control and physical distribution based on the customized specification of the customized product ordered by the customer, and for carrying out planned control based on production data; and customer management means for supporting delivery and maintenance of the customized product based on data of an order acceptance given by the order acceptance management means, wherein upon determination of the customized product, operations of the menu-driven production control means are automatically performed over an online connection and directions for production derived, and data on the customized product ordered by the customer is shared between the customer and a manufacturer of the product.

2. The production control system according to claim 1, wherein the screen shows a menu table of functional blocks, into which the customized product is divided in terms of function.

3. The production control system according to claim 1, wherein the menu table is modified or updated based on market needs.

4. The production control system according to claim 1, wherein the menu table includes a standard specification and a plurality of specifications in respective functional blocks, the customize product being divided into the functional blocks in terms of functions so that the functional blocks are coupled and combined in accordance with criteria of certain positions and connecting devices to perform certain functions.

5. The production control system according to claim 1, further comprising:

a production seat producing means for producing production seats in a number corresponding to an acceptable production schedule found based on an estimated number of products to be produced in consideration of demand size forecast, estimated man-hours for production and assembly capacity of a production process; and a production seat management means for collating production man-hours required for production according to the delivery time of the customized product with an unoccupied state in a seat table corresponding to the production schedule to finalize the delivery time.

6. The production control system according to claim 1, wherein the menu-driven production control means comprises:

a requirement calculation routine for reading out, based on product constitution of the customized product, production arrangement data of constituting elements of the customized product from manufacturing practice data with drawing data, production data and parts procurement data included therein;

an operation direction producing routine for producing data on procedure and guidelines for assembly of the customized product based on product specification data from a memory for storing data on order acceptance and the manufacturing practice data; and a physical distribution control means for providing delivery directions for shipment of a finished product based on data on the delivery time and a receiver stored on the memory for storing data on order acceptance, and data on production progress.

7. The production control system according to claim 1, wherein the customized specification is input to the order acceptance management means from the customer through a public communication network, wireless communication or satellite communication.

8. The production control system according to claim 1, wherein parts arrangement is carried out from a factory to a parts manufacturer through an EDI communication network.

9. The production control system according to claim 1, wherein the order acceptance management means and the menu-driven production control means are connected to the customer management routine, a material procurement and inventory management means, a manufacturing line control means and a physical distribution control means through at least a communication line.

10. A method for producing an air conditioner, which is divided into at least a heat source block for a refrigeration cycle, a driving block for a heat medium circulation in the refrigeration cycle, and a circulation connecting block for the refrigeration cycle, comprising the steps of:

determining a customized product by selection among a standard specification and a plurality of optional specification held with respect to the respective blocks; and providing required directions on material procurement, inventory management, manufacturing line control and physical distribution based on the customized specification, and a delivery time of the customized product, and carrying out planned control based on production data, wherein upon determination of the customized product, the providing step is automatically performed over an online connection and directions for assembly derived.

11. A method for producing an air conditioner having a compressor, a condenser, an expansion device and an evaporator, comprising the steps of:

providing a standard specification and a plurality of optional specifications with regard to respective functional blocks, into which the air conditioner is divided in terms of functions;

producing a specification of a customized product based on specification data determined for the respective functional blocks; and automatically managing over an online connection production seats corresponding to a production schedule for the specification of the customized product based on material procurement data and man-hours for production for the respective functional blocks.

12. A computer program product comprising a computer storage medium having a computer program code mechanism embedded in the computer storage medium for producing a product, the computer program code mechanism performing the steps of:

determining a customized based on a customized specification and a delivery time of the customized product input by a customer through a screen;

preparing a menu-driven specification, which produces the customized specification selected by the customer based on a menu table;

providing required directions on material procurement, inventory management, manufacturing line control and physical distribution based on the customized specification of the customized product ordered by the customer, and for carrying out planned control based on production data; and supporting delivery and maintenance of the customized product based on data of an order acceptance, wherein upon determination of the customized product, operations of the providing step are automatically performed over an online connection and directions for production derived, and data on the custom zed product ordered by the customer is shared between the customer and a manufacturer of the product.

13. The computer program product of claim 12, comprising:

showing on the screen a menu table of functional blocks into which the customized product is divided in terms of function.

14. The computer program product of claim 12, comprising:

modifying or updating the menu table based on market needs.

15. The compute program product of claim 12, comprising:

including in the menu table a standard specification and a plurality of specifications in respective functional blocks, the customized product being divided into the functional blocks in terms of functions so that the functional blocks are coupled and combined in accordance with criteria of certain positions and connecting devices to perform certain functions.

16. The compute program product of claim 12, comprising:

producing production seats in a number corresponding to an acceptable production schedule found based on an estimated number of products to be produced in consideration of demand size forecast, estimated an-hours for production and assembly capacity of a production process; and collating production man-hours required for production according to the delivery time of the customized product with an unoccupied state in a seat table corresponding to a production schedule to finalize he delivery time.

17. The computer program product of claim 12, wherein the providing required directions step comprises:

reading out, based on pr duct constitution of the customized product, production arrangement data of constituting elements of the customized product from manufacturing practice data with drawing data production data and parts procurement data included therein;

producing data on procedure and guidelines for assembly of the customized product based on product specification data from a memory for storing data on the order acceptance and the manufacturing practice data; and providing delivery directions for shipment of a finished product based on data of the delivery time and a receiver stored on the memory for storing data on the order acceptance, and data on production progress.

18. The computer program product of claim 12, comprising:

input the customized specification into the computer program product by the customer through a public communication network, wireless communication or satellite communication.

19. The computer program product of claim 12, comprising:

carrying out parts arrangement from a factory to a parts manufacturer through a communication network.

20. A computer program product comprising a computer storage medium having a computer program cod mechanism embedded in the computer storage medium for producing an air conditioner, which is divided into at least a heat source block for a refrigeration cycle, a driving block for a heat medium circulation in the refrigeration cycle, and a circulation connecting block for the refrigeration cycle, the computer program code mechanism performing the steps of:

determining a customized product by selecting among a standard specification and a plurality of optional specifications held with respect to the respective blocks; and providing required directions on material procurement, inventory management, manufacturing line control an physical distribution based on the customized specification, and a delivery time of the customized product, and carrying out planned control based on production data, wherein upon determination of the customized product, the providing step is automatically performed over an online connection and directions for assembly derived.

21. A computer program product comprising a computer storage medium having a computer program c de mechanism embedded in the computer storage medium for producing an air conditioner, which has a compressor, a condenser, an expansion device and an evaporator, the computer program code mechanism performing the steps of:

providing a standard specification and a plurality of optional specifications with regard to respective function blocks, into which the air conditioner is divided in terms of functions;

producing a specification of a customized product based on specification data determined for the respective functional blocks; and automatically managing over an online connection, upon determination of a customized product, production seats corresponding to a production schedule for the specification of the customized product based on material procurement data and man-hours for production for the respective functional blocks.

* * * * *